United States Patent [19]

Khanna

[11] 4,312,972

[45] Jan. 26, 1982

[54] INTERPOLYMERS OF POLYURETHANES AND ADDITION POLYMERIZABLE MONOMERS

[75] Inventor: Som N. Khanna, Guelph, Canada

[73] Assignee: Uniroyal Ltd., Ontario, Canada

[21] Appl. No.: 247,671

[22] Filed: Mar. 26, 1981

[30] Foreign Application Priority Data

Nov. 17, 1980 [CA] Canada .................................. 364789

[51] Int. Cl.$^3$ ............................................ C08G 18/04
[52] U.S. Cl. ...................................... 528/63; 521/159; 521/163; 521/176; 528/64; 528/66; 528/75
[58] Field of Search ....................... 528/63, 64, 66, 75; 521/159, 163, 176

[56] References Cited

U.S. PATENT DOCUMENTS

| | | | |
|---|---|---|---|
| 3,451,952 | 6/1969 | Slocombe | 521/134 |
| 4,125,487 | 11/1978 | Olstowski | 528/75 |
| 4,133,723 | 1/1979 | Howard | 528/75 |

OTHER PUBLICATIONS

Frisch et al., (ed), *Advances in Urethane Science & Technology*, vol. 4, Technomatic, Westport, Conn., 1976, pp. 132–165.

*Primary Examiner*—Maurice J. Welsh
*Attorney, Agent, or Firm*—James J. Long

[57] ABSTRACT

Interpolymerizate of polyurethane-forming ingredients (polyol, polyisocyanate) and free radical addition polymerizable monomers, at least one of which contains an hydroxyl group (e.g., styrene plus 2-hydroxyethyl methacrylate). The interpolymer is prepared in the presence of a catalyst for polyurethane formation and a free radical addition polymerization catalyst. Product is homogeneous and insoluble. System is useful in reaction injection molding processes.

9 Claims, No Drawings

INTERPOLYMERS OF POLYURETHANES AND ADDITION POLYMERIZABLE MONOMERS

This invention relates to a novel interpolymer of polyurethane and addition polymerizable monomers and to a process for manufacture of such interpolymer.

PRIOR ART

U.S. Pat. No. 3,451,952, Slocombe, June 24, 1969, describes terpolymers which are prepared by copolymerizing three monomers, viz, vinyl chloride, vinyloxyethanol and a fumaric ester, and which are subsequently dissolved in an organic solvent and crosslinked or cured using an organic polyisocyanate curative to yield an insoluble polymeric film material.

One conventional way of making shaped polyurethane articles is by reaction injection molding, RIM. In the RIM process a highly reactive polyol stream containing urethane catalyst and other additives is metered and impingement mixed with a stream of reactive polyisocyanate in a small mixing chamber under pressure (e.g., 6.9 to 20.7 MPa) and the mixed stream is led into a closed mold where the chemical reactions forming polyurethane take place (see "Advances in Urethane Science and Technology", Frisch, et al, Volume 4, pages 132–165). The RIM process has made possible the manufacture of plastic parts of large dimensions and complicated shapes at high volume, for automotive as well as non-automotive applications. In spite of the many advantages of the RIM process, there are certain limitations and disadvantages which are considered barriers to the potentially wide scope for application of this technology. These limitations and disadvantages include, upper viscosity limitation of about 1500 cps (centipoises) for the processing for the materials, and high material cost to obtain high performance polyurethanes. This makes the use of RIM technology uneconomical for certain applications. Also, one-shot polyurethane prepared from low cost common polyols and polyisocyanates exhibits poor strength properties.

The novel polymeric materials of the present invention are useful for RIM applications and do not have the aforesaid disadvantages of conventional RIM polyurethanes.

Polycondensation and free radical addition polymerization reactions are two separate and distinct routes currently utilized for the production of a large majority of commercial synthetic polymeric materials. For example, a polycondensation reaction between polyols and polyisocyanates in the presence of conventional urethane catalysts, e.g., tertiary amines or organic tin or mercury compounds, gives polyurethanes. On the other hand, such ethylenically unsaturated monomers as styrene and 2-hydroxyethyl methacrylate (2-HEMA) copolymerize by a free radical addition reaction which is brought about by the thermal decomposition of a free radical initiator such as benzoyl peroxide. The present invention is based on the surprising discovery that when urethane ingredients such as polyols, polyisocyanates and urethane catalysts are mixed with free radical polymerizable monomers such as styrene plus 2-HEMA and a peroxide initiator, both polycondensation and polyaddition reactions appear to occur simultaneously, without interfering with one another. These unexpectedly result in the formation of a homogeneous and transparent polymeric material in a short time. It is believed that the condensation reaction between polyol and polyisocyanate is first initiated by the urethane catalyst, that the heat of reaction thus generated causes the decomposition of the peroxide initiator into free radicals, and that these catalyze the addition copolymerization of the monoethylenically unsaturated monomers. It also appears that the hydroxyl groups in the free monomer or in its copolymer also react with the isocyanate groups of polyisocyanate to form polyurethane groups. Thus, due to these simultaneous condensation and free radical addition reactions, practically all of the urethane reactants and unsaturated monomeric compounds react chemically to form an insoluble crosslinked interpolymer.

The transparent nature of the resulting polymer indicates that no phase separation occurs during these two different polymerization reactions and that the resulting product is essentially a single phase polymeric material. These interpolymers formed by the chemical incorporation of addition copolymers into polyurethane chains, have enhanced physical strength characteristics, e.g., high flexural modulus and tensile strength properties, compared with unmodified polyurethanes.

The interpolymer of the present invention is accordingly an interpolymer of (A) condensation-polymerizable material and (B) addition-polymerizable material.

The condensation-polymerizable material (A) comprises polyurethane-forming ingredients, ordinarily made up of (a) a polyol such as a long chain polyether polyol having an hydroxyl number of from 25 to 115, and (b) an organic polyisocyanate having available isocyanate groups capable of reacting with (a) to form a polyurethane. The system preferably further includes (c) a small amount of a conventional chain-extender or crosslinking agent for the polyurethane, which is ordinarily a material having a plurality of reactive hydrogen atoms, usually a polyol, a polyamine or an alcoholamine.

The addition polymerizable portion (B) of the interpolymer comprises at least two free radical polymerizable monomers, at least one of which contains an hydroxyl group. Thus, (B) is usually a mixture containing (d) a monoethylenically unsaturated monomer of the formula $R_1HC=CHR_2$ wherein $R_1$ is hydrogen or $C_1$ to $C_4$ alkyl (e.g., methyl, ethyl, butyl) and $R_2$ is aryl (especially phenyl) or equivalent substituted aryl (e.g., phenyl substituted with alkyl [e.g., methyl or ethyl] or halogen [e.g., chlorine]), nitrile, or an ester radical

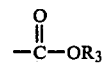

where $R_3$ is ordinarily $C_1$–$C_4$ alkyl (e.g., methyl, ethyl, butyl). This first monomer (d) is devoid of any hydroxyl group. The other essential component of (B) is (e) an hydroxyl-containing monomer, that is, a monoethylenically unsaturated monomer having a single hydroxyl group selected from hydroxyalkyl acrylates and hydroxyalkyl methacrylates having from 1 to 4 carbon atoms in the alkyl group (e.g., methyl, ethyl, butyl).

When the foregoing miscible ingredients are brought together as a liquid mixture of (A) and (B) in the presence of a small, catalytic amount of (C), a conventional catalyst for the polyurethane-forming reaction between (a) the polyol and (b) the isocyanate, and in the presence of (D), a conventional free-radical addition polymerization catalyst or initiator for the monomeric materials (d) and (e), the liquid mixture quickly turns into a solid, crosslinked mass that is insoluble in common organic solvents and has a remarkable combination of improved physical properties.

The proportions of the described ingredients are preferably as follows, expressed by weight:

(a) 100 parts of polyol;
(c) 1 to 30 parts of polyurethane chain-extender or crosslinker;
(d) 10 to 200 parts of the first monomer (hydroxyl-free monomer);
(e) 1 to 30 parts of the second (hydroxyl-containing) monomer; and a sufficient amount of the organic polyisocyanate (b) to provide an NCO index of 1.0 to 1.1. The NCO index is, of course, a measure of the ratio of available isocyanate equivalents on one side to the available active hydrogen equivalents (hydroxyl, amine) on the other side. An index of 1.0 indicates that both equivalents are equal. An index of 1.1 indicates a 10% surplus of isocyanate equivalents.

Long-chain polyols which are commercially available and are used for the production of flexible or rigid one-shot polyurethane solid or cellular products are well known and are described in the literature; any of these are suitable for use as ingredient (a) in practicing the invention. For example, polyether polyols are produced by the addition reaction of an alkylene oxide such as ethylene oxide, 1,2-propylene oxide, 1,2-butylene oxide, tetrahydrofuran and others to polyfunctional alcohols, amines or aminoakanols. Preferred long-chain polyols used in the process of the present invention typically are triols having hydroxyl numbers in the range of about 25 to 115. An example of a suitable polyol is poly(oxypropylene)-poly(oxyethylene)triol having a hydroxyl number of from 25 to 30 and having at least 50% primary hydroxyl groups.

The organic polyisocyanate (b) employed to produce the interpolymer of the invention may be any polyisocyanate conventionally used to make polyurethane, whether an aliphatic, alicyclic or aromatic diisocyanate or higher polyisocyanate, including polymeric forms thereof. Especially useful are polyisocyanates in the form of a "prepolymer". A prepolymer may be described as a partially polymerized substance or one polymerized to a low degree of polymerization, for subsequent polymerization into a higher molecular weight polymeric material. In the urethane industry the term prepolymer implies a reaction product or an adduct of a diisocyanate, for example toluene diisocyanate (TDI) or diphenylmethane-4,4'-diisocyanate (MDI) with a low molecular weight (e.g., 62 to 500) polyol. Such materials usually have a low molecular weight (600–1200), an NCO content of about 3 to 15% by weight, and an equivalent weight of about 300 to 600. A particularly preferred form of polyisocyanate for use in the invention is what is known in the industry as a quasi-prepolymer, which may be described as a type of prepolymer having a molecular weight of about 300 to 600, a free NCO content of about 15 to 40% by weight, and an equivalent weight of about 140 to 300. Prepolymers (including quasi-prepolymers or semi-prepolymers) and similar adducts are described in "The Development and Use of Polyurethane Products" by E. N. Doyle, McGraw Hill Book Company, 1971 edition, pages 29–43, 146, 155, 175, 249, 308 and 328, to which reference may be made for more information.

A single polyisocyanate or a combination thereof may be employed. Representative of the polyisocyanates are the diisocyanates, such as m-phenylenediisocyanate, toluene-2,4-diisocyanate, toluene-2,6-diisocyanate, tetramethylene-1,4-diisocyanate, cyclohexane-1,4-diisocyanate, hexahydrotoluene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyldiphenylmethane-4,4'-diisocyanate and polymeric polyisocyanate having isocyanate functionality of from 2.1 to 2.9 and equivalent weight of 125 to 145 produced by the phosgenation of crude toluene diamines or crude diphenylmethyl diamine.

As indicated, preferred polyisocyanates are the quasi-prepolymers, e.g., Niax D-812 and Niax D-824 (trademarks of Union Carbide Corp.) which are prepared by the reaction of toluene diisocyanate (TDI) with low molecular weight polyols. These TDI-based quasi-prepolymers are not only relatively safer than TDI in handling due to their lower vapour pressure, but also are substantially cheaper (about 50%) than MDI (diphenylmethane 4,4'-diisocyanate). Moreover, interpolymers prepared by using TDI-based quasi-prepolymers have substantial performance and/or cost advantages over those prepared using MDI.

Component (c) of the present interpolymer, that is, the chain extender or crosslinking agent for the polyurethane, is a well known component of conventional polyurethane formulations and requires no special description. As is understood by those skilled in the art, polyurethane chain extenders and crosslinkers are frequently short chain (e.g., $C_2$-$C_{70}$) polyols or polyamines typically having an equivalent weight of from 31 to 500, many of which have the general formulas

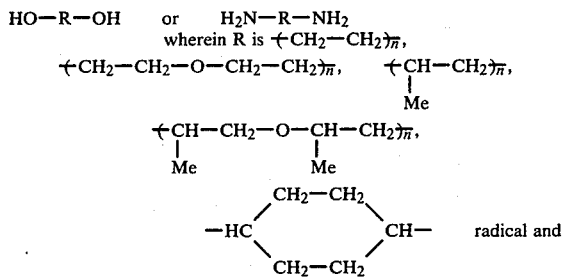

n an integer providing 2 to 70 carbon atoms. Any conventional chain-extender or crosslinker for polyurethanes may be employed in the process of the present invention. Preferably, typical chain-extenders and crosslinkers useful for carrying out this invention are short-chain polyols and polyamines having equivalent weights in the range of 31 to 500 as indicated previously. Non-limiting examples of typical crosslinkers or chain-extenders include ethylene glycol, diethylene glycol, propylene glycol, dipropylene glycol, 1,4-butanediol, 1,4-cyclohexanol, 1,4-cyclohexanedimethanol, glycerol, 1,1,1-trimethylolpropane, pentaerythritol, resorcinol, 1,5-naphthylene diamine, 4,4'-methylene-bis(2-chloroaniline), Quadrol [trademark of BASF-Wandotte Corp. for N,N,N'N'-tetrakis (2-hydroxypropyl)-ethylene diamine], di- or trialkanolamines, Niax 50-810 (trademark of Union Carbide Corp. for a 69.3 equivalent weight chain-extender diol), and Isonol C100 (trademark of Upjohn Co. for $C_6H_5N[CH_2CH(CH_3)OH]_2$).

Non-limiting examples of monoethyleneically unsaturated monomers useful as component (d) of the interpolymer of the invention are monovinylidene aromatic hydrocarbons (e.g., styrene and alphamethylstyrene); alkyl alkacrylates (e.g., methyl methacrylate and ethyl ethacrylate); vinyl esters (e.g., vinyl acetate and vinyl propionate); alkyl acrylates (e.g., methyl acrylate and ethyl acrylate); ethylenically unsaturated nitriles (e.g., acrylonitrile and methacrylonitrile); and acrylamides (e.g., acrylamide, methacrylamide). Further examples are dichlorostyrene and the like.

Non-limiting examples of ethylenically unsaturated monomers having one hydroxyl group, useful as component (e) in the interpolymer of the invention, are hydroxyalkyl acrylates and hydroxyalkyl methacrylates. Illustrations of such compounds are: hydroxypropyl acrylate, hydroxyethyl acrylate, hydroxymethyl acrylate, hydroxypropyl methacrylate, hydroxyethyl methacrylate, and hydroxybutyl acrylate.

As indicated, the present invention is practiced by mixing the condensation polymer forming system (A) [i.e., the polyol (a), polyisocyanate (b) and chain extender or crosslinker (c)] with the addition polymerizable monomers (B) [i.e., the first monomer (d) and the hydroxyl-containing monomer (e)], and with (C) a polyurethane catalyst and (D) a free radical polymerization initiator.

Any conventional catalyst or combination of catalysts for polyurethanes can be used as component (C) in the process of the present invention. For example, chain-amine catalysts alone or in conjunction with one or more organo-metallic compounds of tin or mercury, can be utilized to obtain desired cure rates. Typical catalysts include 1,4-diazabicyclo-2,2,2-octane, DABCO (trademark of Air Products & Chemicals, Inc. for triethylenediamines), triethylamine, N-ethylmorpholine, N,N,N'N'-tetramethylenediamine, N,N,N',N'-tetramethylbutanediamine (TMBDA), alkanolamines, Rubicat A (trademark of Rubicon Chemical Corporation for a proprietary amine type urethane catalyst), dibutyl tin dilaurate, stannous octoate, tributyl tin acetate and dibutyl tin acetate.

It will be understood that any of the free radical polymerization initiators known to those skilled in the art such as organic peroxides, hydroperoxides and azo compounds can be used as component (D) in practicing the invention. Some of the common free radical initiators are benzoyl peroxide; 2,2'-azobisisobutyronitrile, methylethyl ketone peroxide, dicumyl peroxide, lauroyl peroxide, 2,4-dichlorobenzoyl peroxide and tertiary butyl perbenzoate.

The amount of urethane catalyst (C) and polymerization initiator (D) employed in the process of the invention may be in accordance with conventional practice and the amount suitable in any given case may readily be judged by one skilled in the art. In most cases the amount of urethane catalyst will be 0.1 to 1 part and the amount of free radical initiator will be 1 to 5 parts, per 100 parts by weight of (A) plus (B), but larger or smaller amounts can also be used in appropriate cases. Other additives such as pigments, reinforcing and non-reinforcing fillers, blowing agents, surfactants, stabilizers and plasticizers may be added before or after mixing the other ingredients.

In a preferred practice of the invention, the proportions of polymer-forming ingredients are as follows (by weight):

100 parts of polyol (a),
10 to 30 parts of chain extender or crosslinking agent (c),
50 to 150 parts of the first monomer (d),
10 to 30 parts of the second (hydroxyl-containing) monomer (e), and
sufficient organic polyisocyanate (b) to provide an NCO index of 1.0 to 1.05.

In practicing the invention the described ingredients may be mixed together essentially simultaneously or in any appropriate order, using conventional mixing equipment. The mixing may be effected at ambient temperature, or if desired at a suitable elevated temperature (e.g., 40° C.). In any case a spontaneous reaction proceeds without application of external heat; the reaction is exothermic so that a rise in temperature takes place automatically. To make a shaped article the mixing may take place in a suitable shaped mold, or the ingredients while being mixed or substantially immediately after mixing may be introduced into a casting or injection mold.

In practice it is convenient to pre-mix the ingredients to form one portion containing the isocyanate component and a separate portion containing the reactive hydrogen components, these separate portions subsequently being combined to form the final reactive mix which starts to polymerize substantially immediately upon being mixed.

Preferably, a reaction injection molding (RIM) process is used where two liquid component streams, the first stream comprising a long chain polyol, a chain-extender or a crosslinker, a urethane catalyst, a free radical initiator and hydroxyl-containing monomers (and usually also a blowing agent), and the second stream comprising a polyisocyanate or a prepolymer thereof, or a mixture of polyisocyanate and polyisocyanate prepolymer, are metered and impingement mixed under pressure (e.g., 6.9 to 20.7 MPa) into a small mixing chamber (having a volume of, e.g., 2 to 5 ml). More preferably, the two streams should be impingement mixed at a pressure of 15.8 to 20.7 MPa, and then injected into a mold to which a release agent has been applied, at an atmospheric pressure, and at a temperature of 20° to 40° C.

Ethylenically unsaturated monomers may be added to either or both the streams, depending on the nature of the monomers. Thus, the (d) type monomers containing no hydroxyl group can be added to either stream (or both streams), while the (e) type monomers containing an hydroxyl group preferably should be added to the polyol stream but not the isocyanate stream. As the viscosity of these monomers is very low as compared to polyols or polyisocyanates, their addition into a polyol or a polyisocyanate results in a reduction in viscosity. Thus one of the advantages realized by the addition of these ethylenically unsaturated monomers is the lowering of the viscosity of the stream(s) which facilitates the proper mixing of two streams in a RIM process, as two miscible liquids having similar close viscosities are easier or faster to mix than liquids having dissimilar viscosities. Also, the urethane materials having viscosities over 1500 cps which are not processable by currently available RIM equipment can now be made processable by lowering their viscosities by the incorporation of these monomers in accordance with the invention. Lowering the viscosity of either stream by adding ethylenically unsaturated monomer avoids the use of plastcizers to achieve such an effect. As plasticizers usually adversely affect the strength of polymeric materials, avoiding their use is advantageous. In fact, the addition of ethylenically unsaturated monomer additives actually increases the strength of the polymers of the present invention. It is a well known fact that the strength properties of a polyurethane are lowered by the addition of a plasticizer. In the invention the addition of monomers enhances the strength properties. This fact is clearly demonstrated in Example 1 below in which Formulations #2, 3, & 4 have higher strength properties than #1 which does not contain these monomers (see Table 1a and 1b).

The mold pressure developed during molding is typically of the order of 30-70 psi (0.2 to 0.5 MPa) and the mold dwell time for the molded part can be as low as 2 minutes. The high reactivity of the materials generally makes it possible to demold the part in 2 to 3 minutes. If desired the article may be subjected to a "post cure" (additional curing) after removal from the mold, either at room temperature or at elevated temperature.

The following examples will serve to illustrate the practice of the invention in more detail. Materials used in the examples are identified as follows:

Polyether triol—6600 molecular weight copolymer of ethylene oxide and propylene oxide containing about 50% primary hydroxyl groups or equivalent commercially available material such as Pluracol 380 (trademark).

Diol chain extender—69.3 equivalent weight, a 1:1 mixture (molar) of ethylene glycol and propoxylated aniline having the structure $C_6H_5N[CH_2CH(CH_3)OH]_2$, or equivalent commercially available material such as Niax 50-810 (trademark).

Peroxide catalyst—paste of 50% benzoyl peroxide in tricresyl phosphate.

Amine catalyst—N-ethylmorpholine or equivalent commercially available material such as Rubicat A (trademark).

TDI based quasi-prepolymer I—TDI—glycerol reaction product containing free (unreacted) TDI in an amount as to give an equivalent weight of about 140, or equivalent commercially available material such as Niax D-812 (trademark).

TDI based quasi-prepolymer II—TDI—ethylene glycol reaction product containing free (unreacted) TDI in such an amount as to give an equivalent weight of about 140, or equivalent commercially available material such as Niax SF-21 (trademark).

Crude MDI—polymeric crude MDI having NCO functionality of 2.7 and an equivalent weight of 135, such as the commercially available material, Rubinate M (trademark).

Liquid MDI I—isocyanate equivalent 143, or equivalent commercially available material such as Isonate 143L (trademark).

Liquid MDI II—isocyanate equivalent 148, a mixture of MDI (methylene 4,4'-diphenyldiisocyanate) and a small amount (about 5%) of dipropylene glycol-MDI adduct, such as the commercially available material known as Mobay E-451 (trademark).

EXAMPLE 1

The ingredients of the formulations listed in Table Ia below are mixed at room temperature using a mechanical stirrer, degassed under vacuum and poured into a 25 cm × 25 cm × 0.5 cm cavity formed between two aluminum plates on which a mold release agent (e.g., Mold-Wiz 424-7 [trademark]) has been applied. After the ingredients have polymerized into a solid, the sheets are demolded and post-cured for 1 hour at about 100° C. Test speciments are cut from these sheets and tested by various standard test procedures for their physical strength properties. Test data are presented in Table 1b. The heat sag test reported in Table Ib is performed as follows: Test specimens 12.7 cm long, 2.5 cm wide and 0.25 cm thick are secured between two metal plates such that there is 10 cm overhang. Then the samples are placed in an oven at 121° C. for 1 hour and the free end of the specimen is allowed to droop down. After 1 hour the samples are taken out of the oven, allowed to sit at room temperature for ½ hour and the distance the free end has drooped from the horizontal is measured.

Formulation 1, which contains no ethylenic monomers, is outside the invention and is included only for purposes of comparison.

From the test data shown in Table Ib, the following facts become clear:
(1) the incorporation of monomeric styrene and 2-hydroxyethyl methacrylate into a one-shot polyurethane forming composition yields interpolymers having enhanced strength properties over those of polyurethane alone;
(2) an increase in the concentration of 2-hydroxyethyl methacrylate increases the tensile properties of interpolymers.

TABLE I a

URETHANE-STYRENE-2-HYDROXYETHYL METHACRYLATE INTERPOLYMER FORMULATIONS

| INGREDIENTS | FORMULATION, Parts By Weight | | | |
|---|---|---|---|---|
| | 1 | 2 | 3 | 4 |
| Polyether triol | 100 | 100 | 100 | 100 |
| Diol chain extender | 30 | 30 | 30 | 30 |
| 2-Hydroxyethyl methacrylate | Nil | 10 | 20 | 30 |
| Styrene | Nil | 90 | 80 | 70 |
| Peroxide catalyst | Nil | 3.5 | 3.5 | 3.5 |
| Amine catalyst | 0.5 | 0.5 | 0.5 | 0.5 |
| TDI based quasi-prepolymers I and II (1:2 mixture) | 75 | 87 | 99 | 111 |

TABLE I b

PHYSICAL PROPERTIES OF INTERPOLYMERS

| PROPERTY | FORMULATION | | | |
|---|---|---|---|---|
| | 1 | 2 | 3 | 4 |
| Shore Hardness (ASTM D2240-68) | 60D | 65D | 72D | 75D |
| Tensile Strength (MPa) (ASTM D412-68) | 16.5 | 22.8 | 26.9 | 36.9 |
| Elongation at Break (%) (ASTM D412-68) | 160 | 160 | 75 | 75 |
| Flexural Modulus (MPa) (ASTM D790-70) | 140 | 243 | 670 | 1020 |
| Heat Sag (cm) 1 hour at 121° C. | 6.8 | 3.6 | 1.9 | 1.5 |
| Appearance | Transparent | Transparent | Transparent | Transparent |

EXAMPLE 2

Following the procedure described in Example 1, sheets of various interpolymers are prepared using the formulations set out in Table IIa and tested. The test data presented in Table IIb show that the strength properties of the interpolymer obtained using a 1:2 mixture of TDI-based quasi-prepolymer I and TDI-based quasi-prepolymer II as polyisocyanate are the highest of the five polyisocyanates tested.

TABLE II a
FORMULATION OF VARIOUS INTERPOLYMERS FROM DIFFERENT POLYISOCYANATES

| INGREDIENTS | 5 | 6 | 7 | 8 | 9 |
|---|---|---|---|---|---|
| Polyether triol | 100 | 100 | 100 | 100 | 100 |
| Diol chain extender | 30 | 30 | 30 | 30 | 30 |
| Styrene | 70 | 70 | 70 | 70 | 70 |
| 2-Hydroxyethyl-methacrylate | 30 | 30 | 30 | 30 | 30 |
| Peroxide catalyst | 3.5 | 3.5 | 3.5 | 3.5 | 3.5 |
| Amine catalyst | 0.5 | 0.5 | 0.5 | 0.5 | 0.5 |
| Crude | 100 | — | — | — | — |
| 80:20 Mixture of 2,4:2,6-TDI | — | 60 | — | — | — |
| Liquid MDI I Isocyanate Equivalent 143 | — | — | 110 | — | — |
| Liquid MDI II Isocyanate Equivalent 148 | — | — | — | 112 | — |
| 1:2 Mixture of TDI based quasi-prepolymer I and II | — | — | — | — | 104 |

TABLE II b
PROPERTIES OF VARIOUS TERPOLYMERS PREPARED USING VARIOUS POLYISOCYANATES LISTED IN TABLE IIa

| PROPERTY | 5 | 6 | 7 | 8 | 9 |
|---|---|---|---|---|---|
| Shore Hardness (D) | 72 | 66 | 75 | 71 | 75 |
| Tensile Strength (MPa) | 29.1 | 21.4 | 33.2 | 23.8 | 33.5 |
| Elongation at Break (%) | 20 | 55 | 40 | 40 | 40 |
| Flexural Modulus (MPa) | 730 | 455 | 882 | 735 | 980 |

What is claimed is:

1. A homogeneous insoluble crosslinked interpolymer (A) condensation-polymerizable material and (B) free-radical-addition polymerizable material,
   the said (A) being polyurethane-forming ingredients comprising:
   (a) a long-chain polyether polyol having an hydroxyl number of from 25 to 115;
   (b) an organic polyisocyanate having free isocyanate groups reactive with (a) to form a polyurethane; and
   (c) a chain-extender or crosslinking agent for the polyurethane;
   and the said (B) being free-radical addition polymerizable monomeric material which is a mixture of:
   (d) a monoethylenically unsaturated monomer of the formula $R_1HC=CHR_2$ wherein $R_1$ is hydrogen or a $C_1$ to $C_4$ alkyl radical, and $R_2$ is phenyl, nitrile or an ester radical

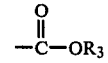

where $R_3$ is $C_1$ to $C_4$ alkyl; and
   (e) a monoethylenically unsaturated monomer having a single hydroxyl group selected from hydroxyalkyl acrylates and hydroxyalkyl methacrylates having from 1 to 4 carbon atoms in the alkyl group,
   the proportions of said ingredients being, by weight,
   100 parts of (a)
   1 to 30 parts of (c)
   10 to 200 parts of (d)
   1 to 30 parts of (e), and
   sufficient (b) to provide an NCO index of 1.0 to 1.1.

2. An interpolymer as in claim 1 in which (b) is a quasi-prepolymer having a molecular weight of 300 to 600, a free NCO content of 15–40% by weight, and an equivalent weight of 140 to 300.

3. An interpolymer as in claim 2 in which (a) is a polyalkyleneether triol having an hydroxyl number of from 25 to 115, (d) is styrene and (e) is hydroxyethyl methacrylate, the amounts of the ingredients being as follows:
   100 parts of (a)
   1 to 30 parts of (c)
   50 to 150 parts of (d)
   10 to 30 parts of (e), and
   sufficient (b) to provide an NCO index of 1.0 to 1.05.

4. An interpolymer as in claim 3 in which (b) is a toluene diisocyanate-based quasi-prepolymer.

5. A method of making an interpolymer as in claim 1 comprising mixing the said ingredients in the presence of (C) a catalyst for the reaction of (a), (b), (c) and (e) to form polyurethane, and (D) a free-radical polymerization catalyst for (d) and (e).

6. A method as in claim 5 in which the said interpolymer is formed in a desired shape by reaction injection molding, by bringing separate active hydrogen containing and NCO containing streams of ingredients together and immediately injecting the mixed stream into an injection mold cavity where interpolymerization takes place.

7. A method as in claim 6 in which (b) is a quasi-prepolymer having a molecular weight of 300 to 600, a free NCO content of 15–40% by weight, and an equivalent weight of 140 to 300.

8. A method as in claim 7 in which (a) is a polyalkyleneether triol having an hydroxyl number of from 25 to 115, (d) is styrene and (e) is hydroxyethyl methacrylate, the amounts of the ingredients being as follows:
   100 parts of (a)
   10 to 30 parts of (c)
   50 to 150 parts (d)
   10 to 30 parts of (e), and
   sufficient (b) to provide an NCO index of 1.0 to 1.05.

9. A method as in claim 8 in which (b) is a toluene diisocyanate-based quasi-prepolymer.

* * * * *